J. W. SLIGAR.
COFFEE MILL.
APPLICATION FILED MAY 3, 1909.
971,084.
Patented Sept. 27, 1910.
2 SHEETS—SHEET 1.
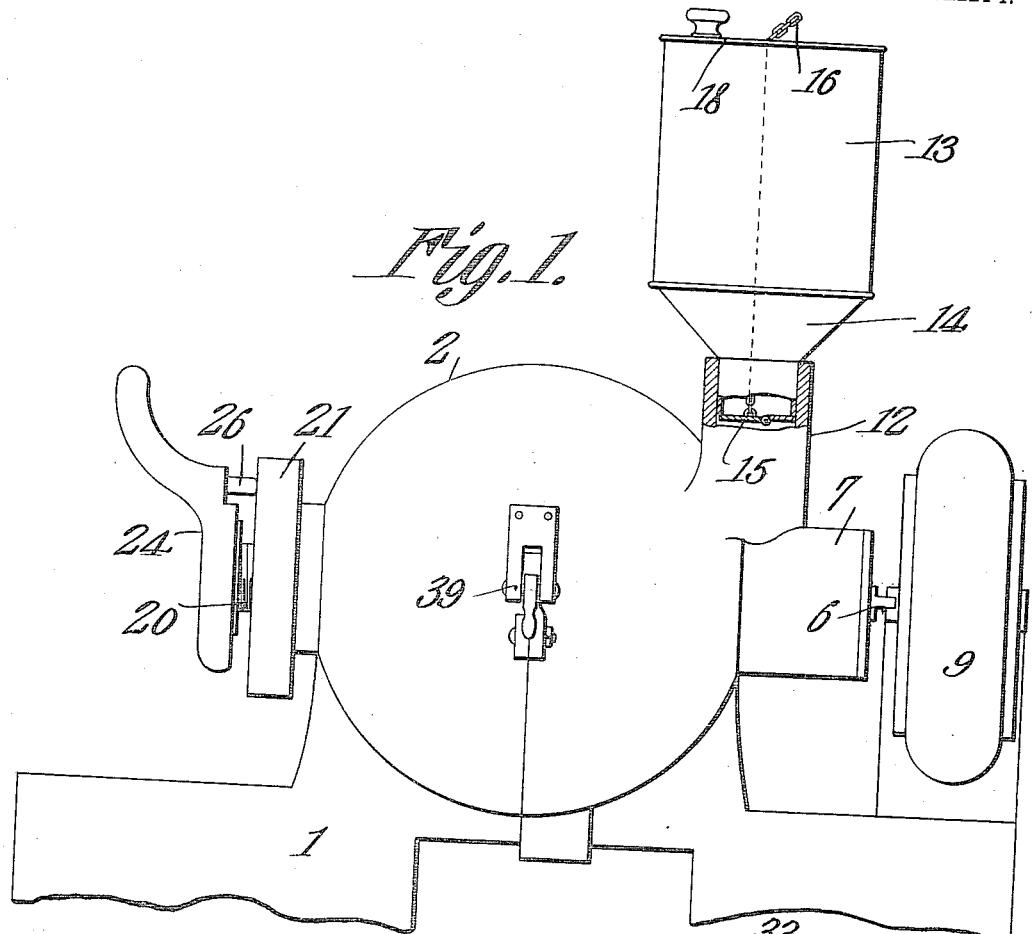
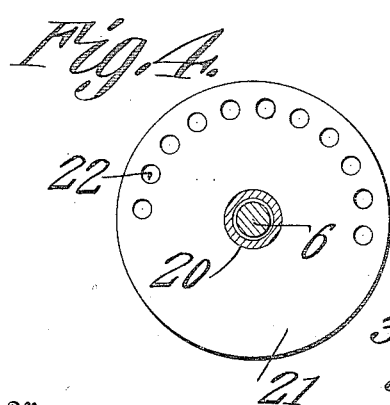
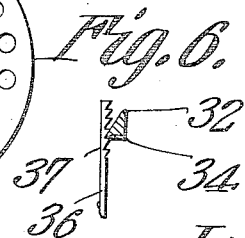
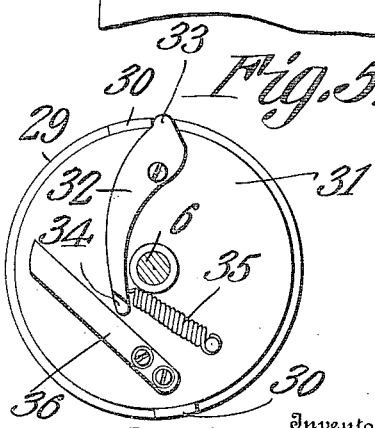
Witnesses
Inventor
James W. Sligar.
By
Attorneys J. W. SLIGAR.
COFFEE MILL.
APPLICATION FILED MAY 3, 1909.
971,084.
Patented Sept. 27, 1910.
2 SHEETS—SHEET 2.
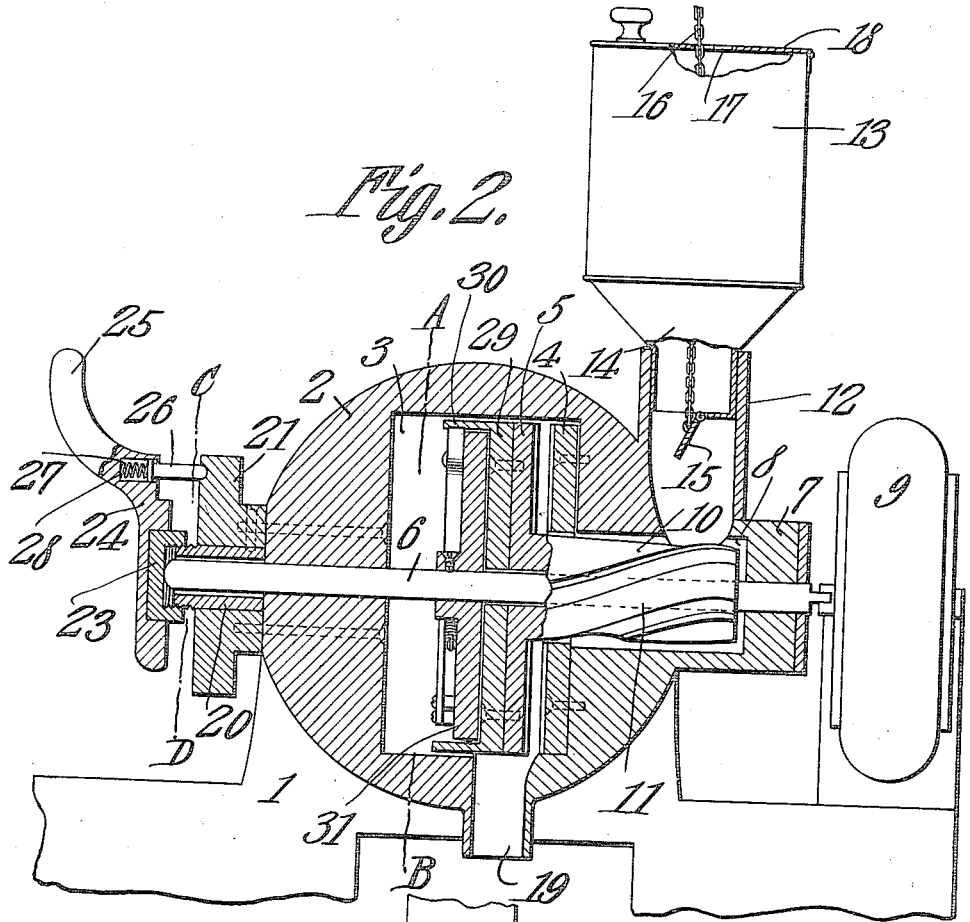
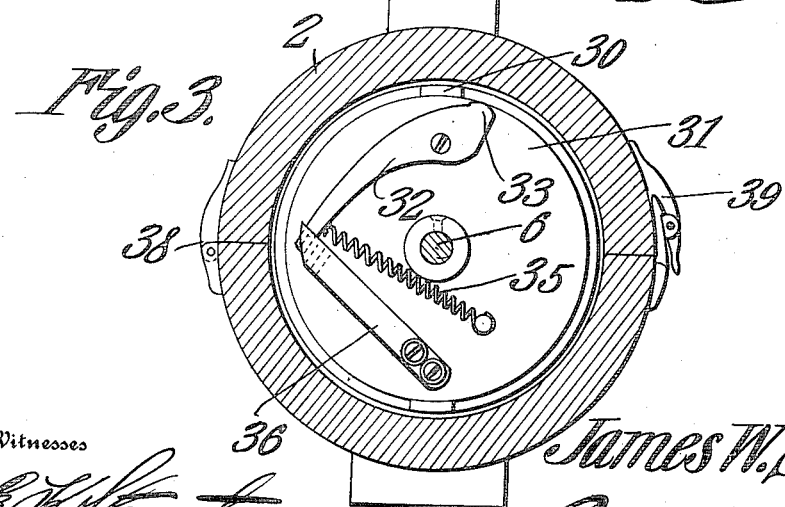
Witnesses
Inventor
James W. Sligar.
By
Attorneys

UNITED STATES PATENT OFFICE.

JAMES W. SLIGAR, OF WEATHERFORD, TEXAS.

COFFEE-MILL.

971,084.  Specification of Letters Patent.  Patented Sept. 27, 1910.

Application filed May 3, 1909. Serial No. 493,617.

*To all whom it may concern:*

Be it known that I, JAMES W. SLIGAR, a citizen of the United States, residing at Weatherford, in the county of Parker and State of Texas, have invented a new and useful Coffee-Mill, of which the following is a specification.

This invention has reference to coffee mills and is adapted for use especially with an electric motor as a driving means.

In accordance with the present invention the coffee to be ground is fed to the grinding burs and provision is made for adjusting these burs for grinding the coffee fine or coarse as desired, and provision is also made for uncoupling the burs from the drive shaft should any hard material liable to injure the burs find its way between them.

The invention will be best understood from a consideration of the following detail description taken in connection with the accompanying drawings forming a part of this specification, in which drawings, Figure 1 is an elevation of the improved coffee mill with parts broken away and in section. Fig. 2 is a longitudinal central vertical section of the improved coffee mill with parts shown in elevation. Fig. 3 is a section on the line A—B of Fig. 2 with more distant parts omitted. Fig. 4 is a section on the line C—D of Fig. 2. Fig. 5 is a view similar to Fig. 3 but with the casing and other parts omitted, showing a different phase in the operation of the parts. Fig. 6 is a detail section of a portion of the structure shown in Figs. 3 and 5.

Referring to the drawings there is shown a suitable base or support 1 upon which is mounted the casing 2 of the coffee mill. The casing 2 is shown in the drawings as globular in shape, but this shape is not at all mandatory and may vary as the taste of the designer may dictate. Within the casing there is formed a chamber 3 and within this chamber are housed the grinding burs 4—5, the bur 4 being fixed to one end wall of the chamber 3 and the bur 5 being mounted on a shaft 6 extending entirely through the casing and through an axial neck 7 formed on one side of the casing. The neck 7 is hollowed out to form an axial chamber 8 which opens at one end into the chamber 3.

The shaft 6 which constitutes the drive shaft of the coffee mill may be driven in any desired manner but it is preferable that this shaft be directly driven by an electric motor typified at 9, it being understood that the motor may be either directly connected to the shaft 6 as indicated or may be otherwise connected to the shaft as may be found most convenient under varying conditions of service.

The bur 5 has formed on its active face a hub 10 passing loosely through the bur 4 and housed in the chamber 8. The hub 10 is formed with exterior ribs 11 forming a long pitch feed screw or conveyer leading to the space between the burs 4 and 5.

Formed on or attached to the neck 7 or formed on or attached to both the neck 7 and the casing 2 is another neck 12 open at the outer end and opening into the chamber 8. The neck 12 is designed to receive the funnel end of a coffee reservoir or hopper 13, the funnel end 14 of which is normally closed by a valve 15 upheld by a chain or flexible strand 16 passing through an opening 17 in the cover 18 of the hopper 13. The opening 17 may be narrow at one end so as to lock the chain in any desired position while at the other end the opening is sufficiently large to permit the chain to pass freely therethrough. When the valve 15 is lifted against the open end of the funnel 14 and the chain 16 is locked in the narrow end of the opening or slot 17 then the contents of the hopper 13 are retained therein, but when the chain is moved out of the narrow end of the slot 17 then the weight of the contents of the hopper will cause the opening of the valve 15 and the coffee will gravitate therethrough and through the neck 12 into the chamber 8 where it will be engaged by the feed screw 11 and directed toward the chamber 3 through the bur 4 and between the said bur 4 and the bur 5 so that when the bur 5 is caused to rotate the coffee will be ground as is customary in mills of this character.

At the lower portion of the casing 2 there is formed an outlet channel 19 through which the ground coffee is discharged into a suitable receptacle, the latter not being shown in the drawings.

The shaft 6 extends through and beyond the end of the casing remote from the motor 9 and exterior to the casing is surrounded by a sleeve 20 threaded at the outer end. This sleeve is in turn surrounded by a disk 21 in the outer face of which is formed a series of notches 22 concentric with the axis of the shaft 6. The disk 21 is made fast to the casing 2 and the sleeve 20 is made fast to the disk 21. The threaded end of the sleeve 20 extends beyond the face of the disk and there receives a nut 23 in the form of a cap nut capable of screwing on the threaded end of the sleeve 20 and receiving the thrust of the corresponding end of the shaft 6. Fast on the nut 23 is an arm 24 provided at its free end with a manipulating handle 25 and this arm carries a pin 26 entering a recess 27 in the arm 24 in which recess there is housed a spring 28 tending at all times to force the pin 26 outward. The pin 26 is so located that its free end, which is rounded, will engage in the notches 22, but because of the rounded end of the pin the latter is easily moved out of the notch in which it may be engaged by a force applied to the arm 24 tending to rotate the same on an axis coincident with the axis of the shaft 6. The pin 26 acts as an elastic stop holding the nut 23 in any adjusted position on the sleeve 20 but at the same time yielding to a sufficient force applied to the arm 24 to rotate the latter. The purpose of the nut 23 is to adjust the distance between the burs 4 and 5, the bur 5 being normally fast to the shaft 6 so as to rotate therewith and to participate in a longitudinal movement imparted to said shaft.

The bur 5 is made fast to a disk 29 on the side remote from the active face of the bur and this disk 29 has at diametrically opposite points, or at a greater number of points if so desired, laterally projecting studs or fingers 30. Fast to the shaft 6 is another disk 31 in close relation to that face of the disk 29 from which the fingers 30 project and the disk 31 is interior to the said fingers 30.

Pivotally supported on the disk 31 is a lever 32 having its shorter end formed into a cam projection 33 while at the longer end there is formed a tooth 34 projecting laterally from the face of the lever remote from that adjacent to the disk 31. This tooth is best shown in Fig. 6. The lever 32 is under the control of a spring 35 fast at one end to the disk 31 and at the other end to the longer end of the lever 32 and this spring tends at all times to move the longer end of the lever 32 toward the shaft 6. When the lever 32 is under the control of the spring 35 and its longer end is moved toward the shaft 6 then the cam end 33 is in position to engage the fingers 30, and the direction of rotation of the shaft 6 and disk 31 is such that the cam end 33 will then engage a finger 30 and impart rotary motion to the disk 29 and through it to the bur 5. Overlying the end of the lever 32 on which is formed the tooth 34 is a spring blade 36 fast at one end to the disk 31 and at the other end formed with a series of notches or teeth 37. Under normal conditions the lever 32 is held toward the shaft 6 by the spring 35 and the end 33 of the lever is therefore in engagement with one of the fingers 30 and the bur 5 is caused to rotate with the shaft 6. If under these conditions some hard material should find lodgment between the burs 4 and 5, then the extra resistance placed upon the bur 5 will cause the finger 30 to ride past the cam 33 thus forcing the other end of the lever 32 outward against the action of the spring 35 and this action continues until the tooth 34 engages in some one of the notches or behind some one of the teeth 37. The cam end 33 of the lever 32 is thereby locked out of engagement with the fingers 30 and therefore the disk 31 may rotate with the shaft 6 without causing the bur 5 to participate in such movement. When the bur 5 is thrown out of commission by being stopped by some hard material which will not crush as will the coffee berries, then the bur 5 may be separated from the bur 4 to a greater extent by the proper manipulation of the handle 24 and the harder material may be allowed to fall from between the burs to the passage 19 and so escape from the machine. In order to reset the machine so that the bur 5 will again participate in the rotation of the shaft 6 it is necessary to gain access to the interior of the casing 2 and for this purpose the casing is made in two parts hinged together at one side as indicated at 38 while at the other side the casing is normally held in the closed position by a latch 39 which may be either a cam latch as indicated or any other type of latch adapted for the purpose.

While the device has been described as a coffee mill it will be understood that it may be used for grinding other materials than coffee. It will be further understood that the tension of the spring 35 is such that the lever 32 will be held in operative position against the resistance offered by grindable materials such as coffee but this spring is so proportioned that it will yield to forces which would become injurious or destructive to the active faces of the burs 4 and 5.

What is claimed is:—

1. In a grinding mill, a fixed bur and a rotatable bur, a rotatable shaft carrying the rotatable bur, and a coupling between the shaft and bur thereon comprising a cam lever fixed to the shaft for rotation therewith, a spring tending to move the lever to the active position, a latch member in the path of movement of the lever against the action of the spring for holding the lever in the inactive position, and a coacting member fast to the rotatable bur and adapted to be normally engaged by the cam portion of the cam lever.

2. In a grinding mill, a fixed bur and a rotatable bur, a rotatable shaft carrying the rotatable bur, and a coupling between the shaft and bur thereon comprising a spring constrained cam lever fixed to the shaft for rotation therewith, said lever having a tooth formed on the end thereof remote from the cam, a spring blade also rotatable with the shaft and having its free end formed with engaging means in the path of the tooth of the cam lever, and a coacting member fast to the rotatable member and adapted to be normally engaged by the cam portion of the cam lever.

3. In a grinding mill, a fixed bur and a rotatable bur, a rotatable shaft carrying the rotatable bur, projecting members carried by the rotatable bur, a carrying member fast to the shaft and interior to the projecting members on the rotatable bur, a cam lever on the carrying member having a cam formed at one end and a tooth at the other, a spring fast at one end to the carrying member and at the other to the lever, and a spring blade on the carrying member having its free end formed with a series of engaging members for the tooth on the cam lever and in the path of the said tooth when the lever is moved in a direction against the normal action of the spring, the cam end of the cam lever being adapted to normally engage the projecting members on the bur.

In testimony that I claim the foregoing as my own, I have hereto affixed my signature in the presence of two witnesses.

JAMES W. SLIGAR.

Witnesses:
R. K. HARRIS,
JOEL W. HICKS.